United States Patent [19]

Martin

[11] Patent Number: 4,682,380
[45] Date of Patent: Jul. 28, 1987

[54] BOX FOR BEEKEEPING FOR THE CREATION OF A BEE COLONY, CHANGE OF QUEEN FROM A HIVE IN ACTIVITY AND PARTIAL RESTRICTION OF BROOD REARING

[76] Inventor: Alain Martin, 25 boulevard de l'Europe, 69600 Oullins, France

[21] Appl. No.: 818,118

[22] Filed: Jan. 13, 1986

[30] Foreign Application Priority Data

Jan. 14, 1985 [FR] France ............................ 85 00616

[51] Int. Cl.⁴ ............................................ A01K 49/00
[52] U.S. Cl. ............................................................ 6/9
[58] Field of Search ............................ 6/1, 4 A, 7, 9

[56] References Cited

U.S. PATENT DOCUMENTS

| | | | |
|---|---|---|---|
| 406,972 | 7/1889 | Tinker | 6/9 |
| 874,579 | 12/1907 | Eckman | 6/9 X |
| 1,393,757 | 10/1921 | Crease | 6/9 |
| 1,482,468 | 2/1924 | Hershiser | 6/9 |

FOREIGN PATENT DOCUMENTS

| | | | |
|---|---|---|---|
| 2532816 | 3/1984 | France | 6/1 |
| 440820 | 3/1984 | Switzerland . | |

OTHER PUBLICATIONS

"Apiculture", Jean Porst, pp. 303, 316, 317, 341, 342, 343, 344, 345, 347, 348, 370, 371.
Sante De L'Abeille Journal, p. 87.
Adam's, pp. 28 and 87.

Primary Examiner—Robert P. Swiatek
Attorney, Agent, or Firm—Parkhurst & Oliff

[57] ABSTRACT

A box for beekeeping is disclosed which is adapted to be entirely fitted into a superhive, or into an upper honey chamber, or into a hive body, such that any frame with which it is fitted takes the place of a frame of the superhive or hive body. The box may be fitted with specially designed accessories such as a queen-excluder which includes an opening adapted to be obturated by a sliding plastic film or a plastic film obturating an opening made in the bottom of the box.

10 Claims, 11 Drawing Figures

BOX FOR BEEKEEPING FOR THE CREATION OF A BEE COLONY, CHANGE OF QUEEN FROM A HIVE IN ACTIVITY AND PARTIAL RESTRICTION OF BROOD REARING

The present invention relates to a box adapted to be entirely fitted in a superhive or upper honey chamber, or in a hive body, in which are introduced frames which take the place of frames of the superhive or of the hive body in which it is fitted, as well as to applications thereof in the domain of beekeeping.

More precisely, the invention relates to the means described hereinabove in its application as means for housing colonies of bees in activity of which the queen does not stop laying, particularly during the operations of transfer of bees and of requeening.

In fact, in an active colony of which the queen's capacity of laying becomes deficient, it may be advantageous to change the queen in a controlled manner.

This necessitates the isolation of a queen from a second colony, transfer thereof to the place where the change is to take place, and introduction thereof in the first colony, after elimination of the deficient queen.

At the present time, there are three principal ways of transferring a queen, accompanied by a large number of workers or not, from one place to another:

(i) In a small hive with frames, provisions, brood comb, and generally containing half of the colony present in the usual types of hive, such as for example the DADANT hive and the LANGSTROTH hive.

This mode of transfer presents the drawback of necessitating the displacement of a large quantity of bees and imposes on the beekeeper equipment which may exceed his limit; in addition, the packing may not be re-usable.

In practice, this mode is reserved solely in order to increase the number of hives in production.

Moreover, the large proportion of worker bees enclosed around the queen involves an appreciable risk of destruction of the bee colony and in particular of the queen by suffocation.

(ii) In a queen's transport box, such as the BENTON cage or the MILLER cage.

This mode of transfer is characterized by a reduced number of bees in the presence of the queen and of provisions, but in the absence of frames and in the absence of brood comb.

It presents the drawback of stopping the queen laying, this involving not only a period of readaptation of the queen to laying, outside the colony to be requeened, but also a certain risk of irreversible weakening of the capacity to lay when the queen is in her new environment.

The queen is not in an ambient environment best suited to her survival.

(iii) a simplified compromise between the two modes set forth hereinabove and which consists in the first without frame and without brood comb.

It accumulates the drawbacks of the two modes from which it is derived, which cannot justify the advantages of a better chance of survival in the ambient environment during transfer and of quicker adaptation in the receiving environment.

Thus, presently known methods for transferring a queen from one given place to another and with a view to introducing her into a new colony, do not make it possible to ensure simultaneously continued laying in safety for the queen, and the acceptance of this queen by her new colony, with virtual certainty; such operations carried out simply and at low cost for the acquirer of this queen, and without excessive, cumbersome equipment which may or may not be re-usable.

Reference may usefully be made to "APICULTURE" by Pierre JEAN PROST, Editions J. B. BAILLIERE (1977), pages 303, 316, 317, 371, 344, 345, 347, 348.

For example, as far as the practical difficulties and costs of such operations are concerned more particularly, they are within the regulations of safety, limitation of weight and of volume in force, in the precise case of transfer by post.

The box according to the invention overcomes the drawbacks of the means of transfer used heretofore, and avoids the difficult, intermediate operations, not without risk, known to the man skilled in the art, when introducing a queen into a new colony.

By using said box, the queen can be transferred, without her stopping to lay, from an initial ambient environment to the ambient environment which must enclose her; she can be transferred in this ambient environment from one place to another, without her stopping to lay, and can pass from the ambient environment which encloses her to the ambient environment to be requeened.

However, the box is not limited to this use alone.

Another important feature of the present invention resides in the fact that it allows the partial restriction of the queen's brood-rearing or laying.

In fact, it may be advantageous to limit, voluntarily and momentarily, the quantity of brood of a bee colony, both to avoid swarming and to increase the crop; this is a well known phenomenon in beekeeping.

It is also a method currently used for rearing queens.

Moreover, restriction of laying in the presence of Varroasis, which is a disease which kills the colony if there is no treatment, is an effective means of biological control.

It necessarily prepares the way for treatment by a chemical product, which is still more effective against Acarida.

Such partial restriction of brood rearing is currently effected in several manners, depending on the desired duration and purpose:

Either on a few frames of the hive, which are separated by one or more vertical queen excluders, which prevents the queen from extending her laying to all the frames of the hive. This is also called a reclusion chamber.

Handling of the frames and the queen excluders remains delicate and difficult. It is especially reserved for rearing queens.

By restricting the queen in a superhive, or upper honey chamber, or a whole body, separated by horizontal queen excluders.

This method is difficult to carry out and is not always efficient due to the large number of frames where the queen may continue to lay abundantly.

By enclosing the queen in a JONES cage which is characterized by a small cylindrical compartment of some square centimetres, encrusted on the face of a hive frame. It enables the queen to continue to lay some eggs. However, its use can only be very limited in time. The free cells for brood rearing are very quickly filled; the queen stops laying after a few hours. This is especially a means for introducing a new queen into a hive.

The presently employed methods and equipment differ depending on whether it is desired to obtain a partial restriction of brood rearing of short or long duration, depending on the desired result and the season. Moreover, these operations are often difficult and delicate to carry out; they require additional equipment.

Reference may usefully be made to the Journal "SANTE DE L'ABEILLE", No. 74 (1983), page 87, and Pierre JEAN PROST's book "APICULTURE", Editions J. B. BAILLIERE (1977), pages 341, 342, 343, 370.

By using the box according to the invention, the drawbacks of the various means for partially restricting the queen's laying, currently used heretofore, are overcome; it greatly simplifies the beekeeper's work. Finally, it is a new tool and means for fighting against Varroasis.

Another advantageous feature of the present invention resides in the possibility of forming micronuclei in the box, for the fecundation of young virgin queens and with a view to subsequent transfer and introduction thereof into an orphaned hive.

Several of such nuclei may be grouped in a superhive or hive body, each having an independent entrance. They then benefit from the heat of the adjacent colonies. Several superhives or bodies containing several boxes of nuclei may also be superposed, or such nuclei may benefit from the heat of producing colonies.

More precisely, the box according to the invention enables several nuclei to be grouped together and survive during the winter season.

In fact, it is well known that, in relatively cold climates, it is difficult, if not impossible, for small colonies of less than 1 kg of bees to survive without grouping them together during the winter.

Reference may usefully be made to Brother ADAM's book "MA METHODE D'APICULTURE", Edition Le Courrier du Livre (1980), pages 28 and 87.

The invention therefore relates to a box for beekeeping, allowing the creation of a small colony of bees (currently called nucleus), the change of queen from one hive in activity and the partial restriction of brood rearing or laying, said box being characterized in that it is in the form of a parallelepipedic enclosure adapted to be fitted in a superhive, or upper honey chamber, or in a hive body in place of a certain number of frames disposed normally in said body or said superhive, this enclosure:

(a) being provided with a plurality of parallel, vertical frames spaced apart from one another and from the bottom by a distance sufficient to allow the bees and the queen to circulate, (b) comprising at least one entrance, on at least one of its walls, said entrance being obturated when the box is placed in position in the hive and being located opposite the free space between two frames disposed in said box;

(c) the bottom of the enclosure being fixed whilst the cover is removable, these two elements comprising an opening whose dimensions are such that they allow at least the passage of the queen and, if necessary, the mixing in less than twelve hours of the bee colony contained in the hive with another colony previously formed or introduced in said box;

(d) the bottom also comprising two slots disposed on either side of the opening that it presents, these slots being located near two opposite walls and having a length greater than the width of said opening;

(e) possibly a removable netting whose meshes are less than three millimetres, said netting being adapted to be disposed between the cover and the top of the frames disposed inside the box and whose dimensions correspond to the interior dimensions of said box;

(f) a removable flap for obturating, if necessary, the opening and the slots made in the bottom of said box; such a removable flap may advantageously be maintained by simple fit against the bottom of the box, or even be mounted to slide against said bottom.

Furthermore, although the walls of the box are advantageously flat, these walls may comprise parts in relief, for example when the box is made of metal, such parts in relief making it possible, on the one hand, to maintain the frames in spaced apart relationship within the box and, on the other hand, allowing the passage of the crampons provided on the inner wall of the hive and which allow the bees to pass.

Furthermore, the frames disposed inside the box are conventional frames which therefore comprise an upper part or head which projects laterally. In such a case, each frame head rests in a notch made on the upper edge of two opposite walls of the box.

Although the box according to the invention may be designed to be fitted with a number of frames equal to any number of frames of the superhive or hive body in which it may be fitted, a preferred embodiment of the invention is a box of which the number of frames with which it is provided is limited and is generally at the most equal to 6, and preferably 2, 3 or 4 when the number of frames of the superhive or hive body in which it is fitted is equal to or greater than 6.

The box according to the invention may be fitted with specially adapted accessories such as a queen-excluder placed on the bottom and in which is made an opening adapted to be obturated by a plastic film which may be removed by sliding in two slots made in the queen-excluder on either side of the opening, a plastic film which serves to obturate the upper and lower parts of the opening made in the bottom of the box and which passes in two slots made on either side of this opening.

The spaces between the box and the inner walls of the superhive or hive body in which it is fitted, as well as the spaces between the frames and the inner walls of the box measure a few millimetres. The bees tend to clog spaces of less than three millimetres. The material used is therefore of prime importance in order to avoid this type of drawback.

The present invention provides boxes made of material on which the wax or propolis adheres the least possible. It is well known that it is difficult to cover certain plastics materials as well as certain metals, such as aluminium, with propolis or wax. Suitably treated wood is still a very acceptable material.

Purely by way of example, an ultimate precaution may be taken by surrounding the box with a cover of plastic film or aluminium foil in order to avoid the box sticking and to allow it to be easily handled. Care must be taken that the openings in the cover and the bottom of the box, as well as the entrances, are not blocked by these films.

Finally, the space between the lower bar of the frames of the box and the bottom of said box is at least 5 mm, when the box is fitted with its queen excluder or plastic film, with or without the flap. This space cannot be filled by the bees; it enables the queen and workers to circulate on the bottom of the box and to pass from one frame to the other.

The invention will be more readily understood on reading the following description with reference to the accompanying drawings, in which:

FIG. 1 is a general, exploded view of the box according to the invention, cut longitudinally and vertically, showing various accessories including the removable cover 2, the netting 6, the queen excluder 7, the plastic film 4, the flap 3.

Figure 10:
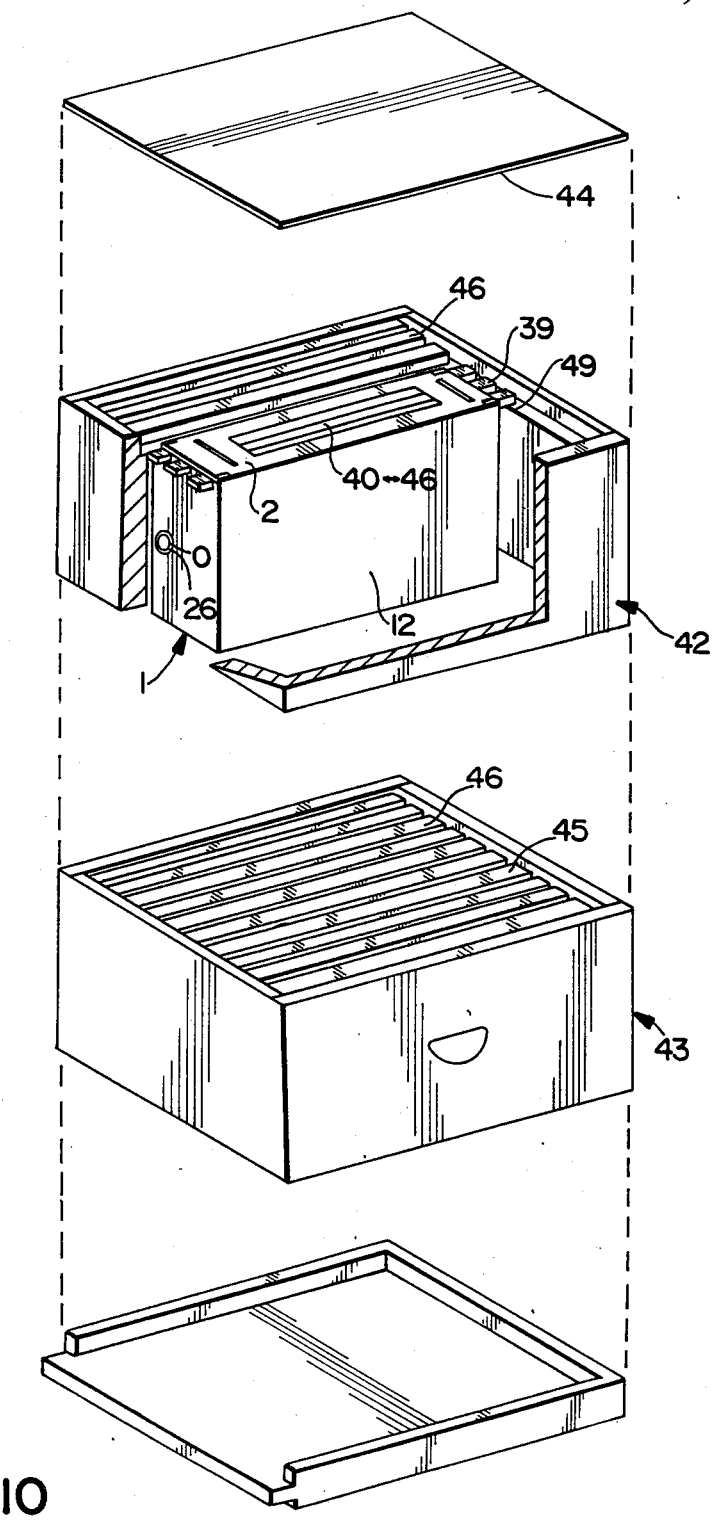

FIG. 10 represents a general, exploded view of a particular design of hive. This hive is characterized by two identical bodies and by one type of frame. The box according to the present invention is fitted in one body. This is a particular case of a box which contains three body frames.

Figure 11:
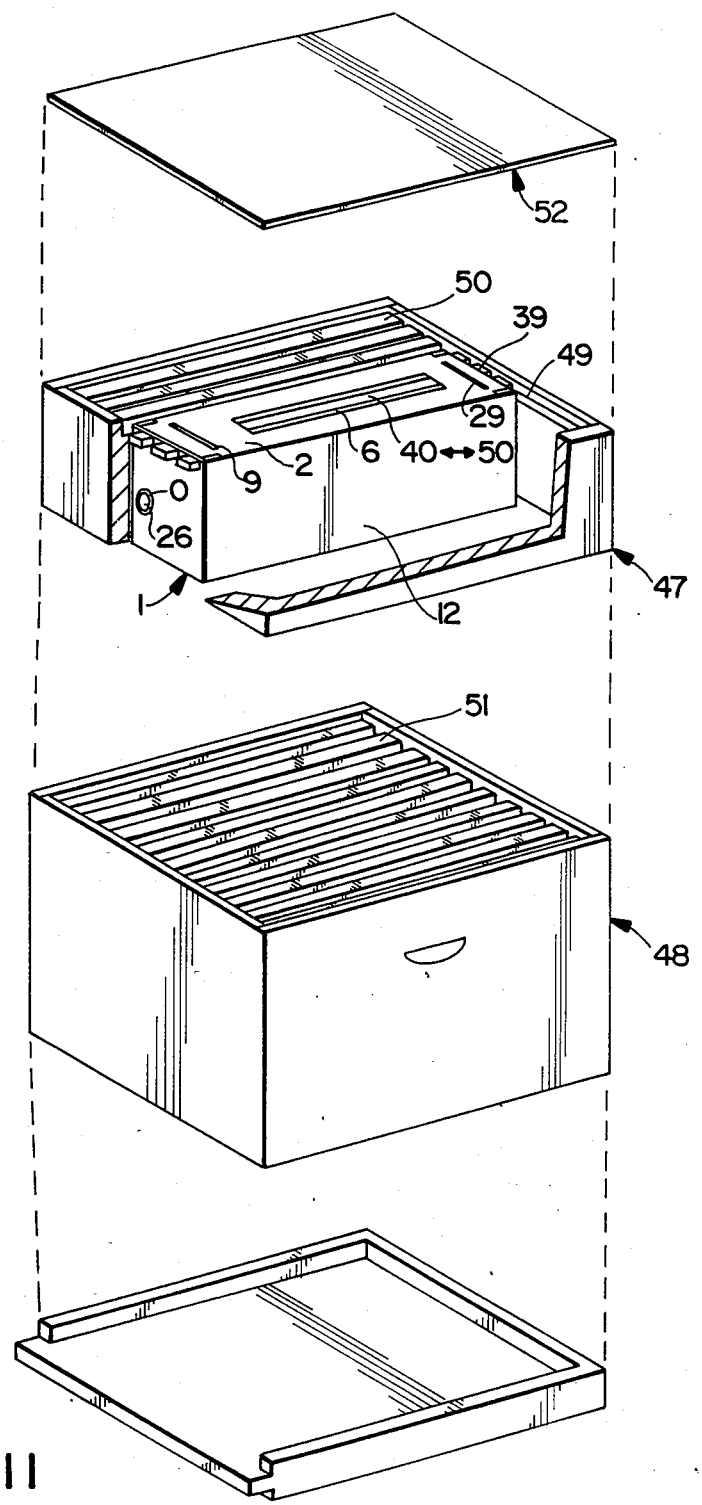

FIG. 11 shows a general, exploded view of a particular design of hive. This hive is characterized by a body and a superhive or upper honey chamber, and by two types of frames. The box according to the present invention is fitted in the superhive. This is a particular case of a box which contains three superhive frames.

This box 1 possesses a bottom 22 fast therewith, with an opening 21 and a removable cover 2, with an opening 10, identical to the one in the bottom. The front and rear walls 13, 14 respectively are pierced with symmetrical holes 26 and 19 which may serve as entrances; the latter are obturated by removable stoppers 0. These walls are internally provided with slides 17 which enable the frames 40 to be guided. The frames are separated at the top by racks 15, and the spacing between frames is maintained from top to bottom by a spacer strip 20. The frame heads 39 emerge from the box and rest on the front and rear walls of the box, in notches 16. For transfer and with a view to introducing it into a hive to be requeened, the box according to the invention, provided with its frames, with provisions, bees and a laying queen, is provided with a special device which will now be described.

A fine-mesh netting 6, of the same dimensions as the interior of the box, is placed on the frames. The cover 2 is then deposited on this netting. The cover fits between walls 11 and 12 of the box. It is pierced with two identical slots 9 and 20 symmetrical to slots 35 and 23 in the bottom of the box. This cover is immobilized at the four corners by four notches 34, which fit on four lugs 18 at each corner inside the box.

These four lugs are the extension of spacer strips between the frames and the lateral sides of the box. The perforated bottom is pierced with two slots 35 and 23, similar and symmetrical, and of length virtually identical to the width of the bottom of the box. A plastic film 4 is introduced into these slots which completely obturates the opening of the bottom both internally (28) and externally (30). This film is stretched and its two edges 27 are stuck with adhesive tape 8. This plastic film is covered with a sheet of paper 5 of small thickness 33; it is fixed with adhesive tape 41 on the lateral sides of the bottom of the box.

Figure 1:
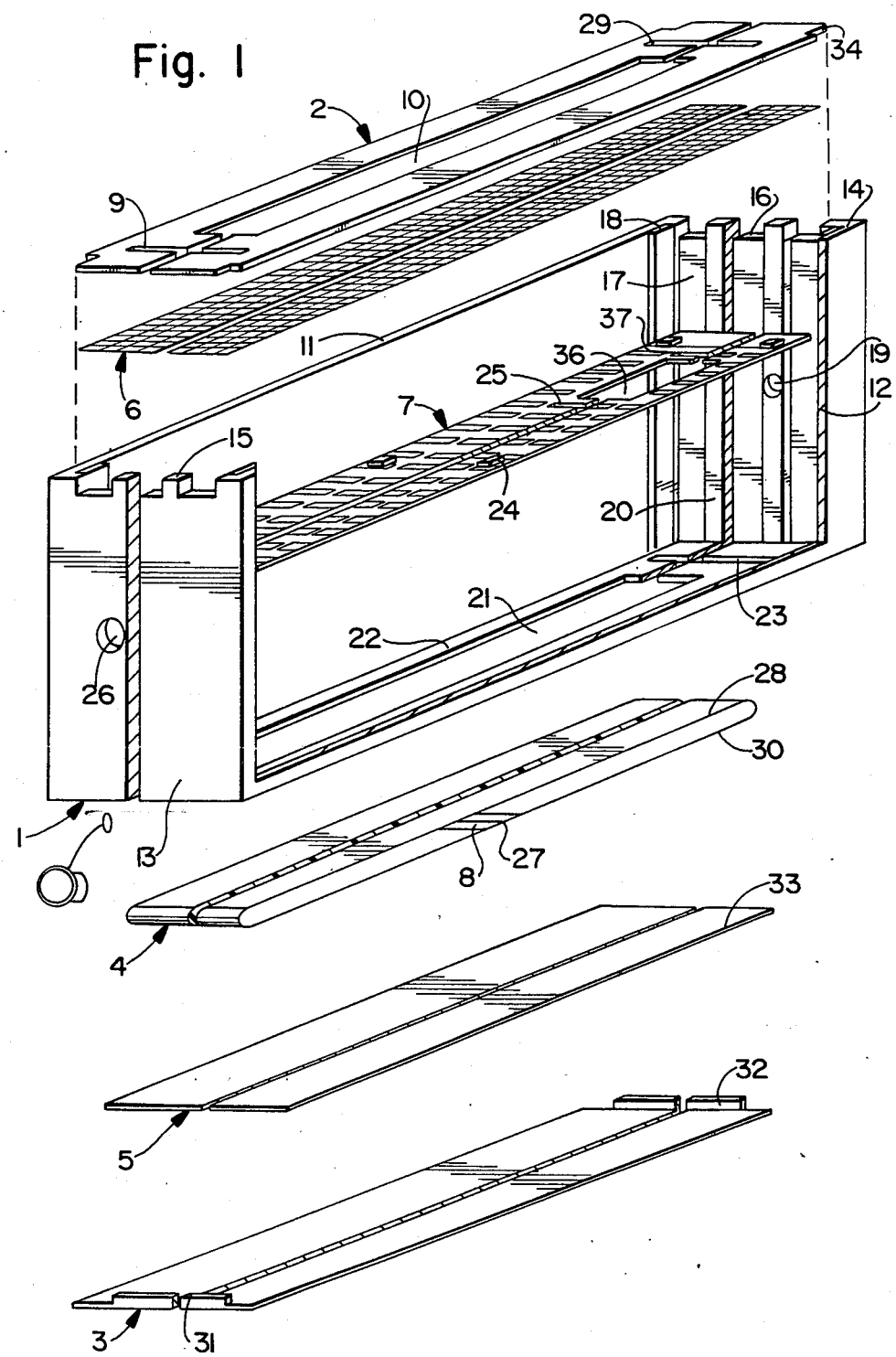
Figure 2:
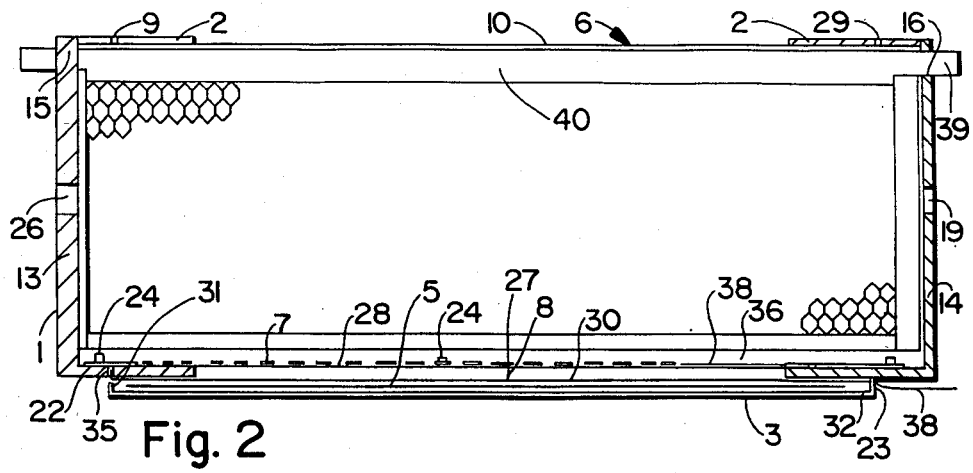
FIG. 2 is a view in longitudinal and vertical section of the box, provided with its various accessories and with a hive frame.
Figure 3:
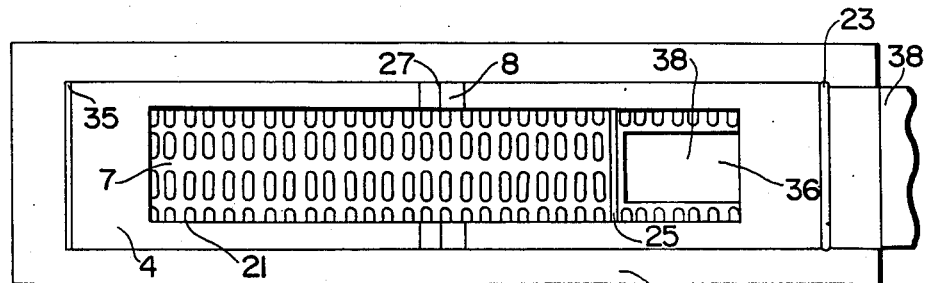
FIG. 3 is a view of the outer bottom of the box, internally equipped with a queen excluder and placed on the bottom; a plastic film partially covers the queen excluder; a second plastic film covers the bottom of the box.
Figure 4:
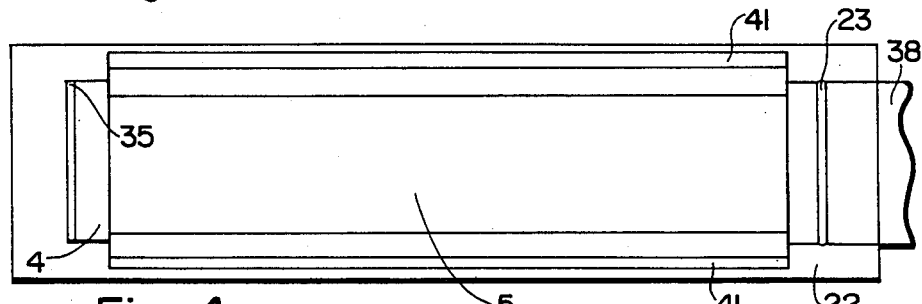
FIG. 4 is the same view of the outer bottom of the box as FIG. 3, with, in addition, a sheet of paper taped thereon.
Figure 5:
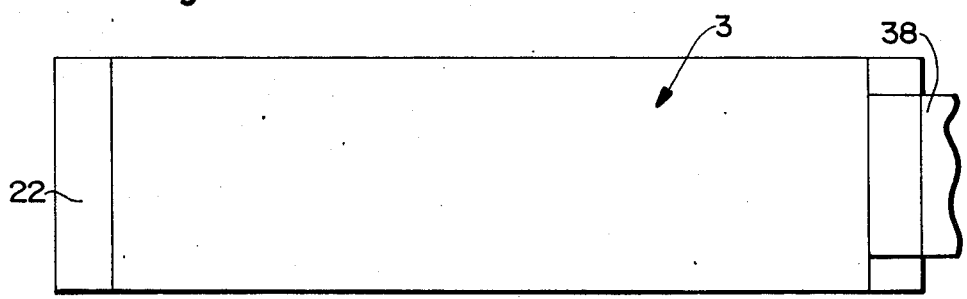
FIG. 5 is the same view of the outer bottom of the box as FIGS. 3 and 4, but the bottom is provided with its flap.
Figure 6:
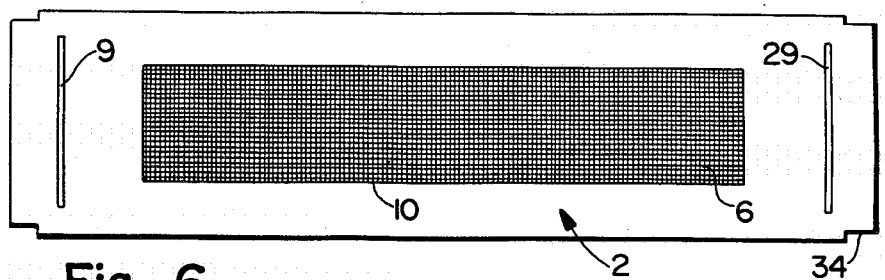
FIG. 6 is a plan view of the removable cover of the top of the box, this cover being provided with a netting.
Figure 7:
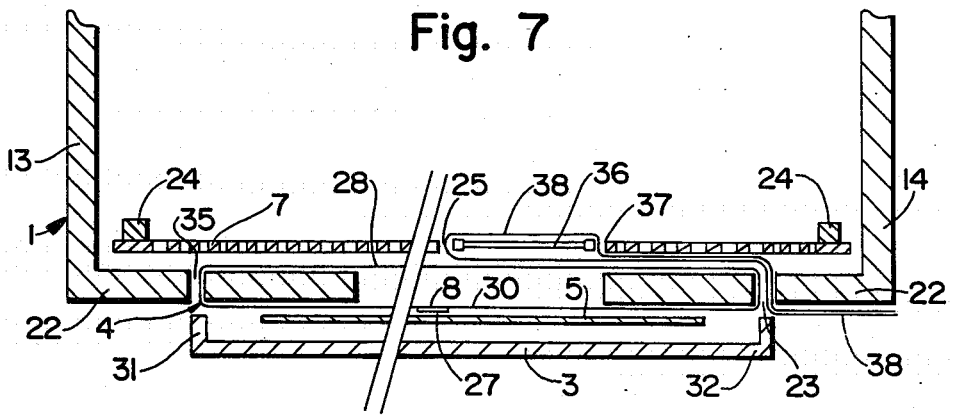
FIG. 7 is a detailed view in longitudinal and vertical section of the bottom of the box and of its various accessories.
Figure 8:
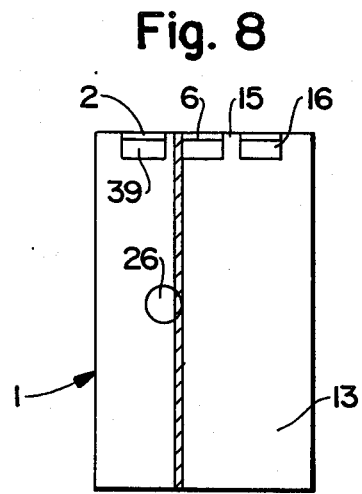
FIG. 8 is a view of the front face of the box, from the outside; the box is sectioned vertically.
Figure 9:
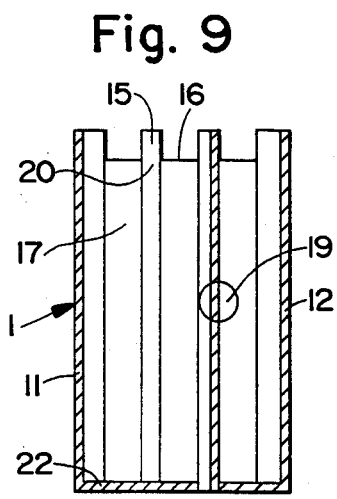
FIG. 9 is a view of the front face of the box, from inside; the box is sectioned vertically.

As clearly shown in FIG. 4, the slots, as well as a sufficient part of the plastic film, are not covered by the paper. The sheet of paper is positioned then fixed so that the plastic film can easily slide without damaging the paper.

A flap 3 is applied externally on the bottom of the box. Two tabs 31 and 32 of this flap fit in the slots 35 and 23. It should be noted that this flap 3 may also fit externally on the cover 2 in the slots 9 and 29. The paper which is sandwiched between the stretched plastic film and the flap is thus out of reach of the bees. The removable perforated cover of the top of the box, as well as the flap 3 of the bottom may be firmly fixed with reinforced adhesive tape. Better safety during transfer is thus ensured.

The introduction of the box into a hive to be requeened is preceded by seeking then removing the undesirable queen, in known manner. To prepare requeening with the aid of the box according to the invention, the flap is removed from the bottom of the box, the plastic film is cut then pulled. It slides under the sheet of paper, thus placing the bees in contact with the paper. Care must be taken not to damage the paper when manipulating. The box is fitted depending on the design of frame such as for example 50 or 46 or 51, either in a superhive or upper honey chamber such as 47 which contains only empty frames without bees, or in a hive body such as 42 or 48, equipped in the same manner. The frame heads which project from the box are fixed on the racks 49 of the superhive or on the racks 45 of the hive body, in accordance with FIGS. 10 and 11. The spacing between frames 20 is in fact the same in the box as in the superhive or hive body. The two colonies are generally mixed a few hours after the box has been placed on the orphaned colony. The queen, which has not stopped laying, has a good chance of being accepted as new queen of the recently restructured colony. She very rapidly descends to lay in the lower hive body 43 or 48, passing through the opening 21 in the bottom of the box.

Another subtle feature of the present invention resides in the possibility of uniting the worker bees of the box with those of the colony to be requeened, but momentarily retaining the new queen, still laying, prisoner in the box. In fact, in certain cases, it may be necessary voluntarily to delay the passage of the queen from the box to the brood frames of the hive to be requeened, particularly after a transfer of long duration where the user of this box wishes to check the presence and state of health of the queen.

As shown in FIGS. 1, 3, 4 and 7, the box according to the invention is then equipped with a perforated queen-excluder 7 made of plastics material, having the same dimensions as the interior of the box and its sheet of paper. The queen-excluder is maintained applied on the bottom of this box, by a plurality of projecting lugs 24 which are fixed on the excluder and on which the lower bars of the frames rest. This queen-excluder is provided with an opening 36, at one of its ends. On each front or rear side of this opening, the queen-excluder is pierced with two grooves 25 and 37, of length greater than the width of the opening made in this excluder. These grooves allow the passage of a second plastic film 38. The latter entirely covers the opening of the queen-excluder; it slides in grooves 25 and 37 and emerges from the bottom of the box via groove 23. After the destruction of the paper and the mixing of the bees of the two colonies, this opening 36 may be subsequently cleared by removing the plastic film from outside the box and more particularly outside the hive, without opening the latter. The film also slides between the body 48 and the superhive 47, or the body 43 and 42 of the hive. This enables the queen to pass through this opening thus cleared, from the box to the brooding nest of the hive, at the opportune moment.

Consequently, the box is a means for partially restricting the queen's laying, of short duration, of from a few hours to a few days.

However, it may also serve to restrict laying over a longer period of time, from a few days to a few weeks, more particularly with a view to increasing the crop and for preventing swarming; 10 days before the beginning of nectar-gathering, the queen is sought and enclosed in the box. The latter is provided with its queen-excluder of which the opening is obturated by the plastic film, with frames and its removable cover 2. The box is placed in a superhive or in a body, on the honey producing hive. The plastic film 38 is allowed to project between the superhive and the body, or between two hive bodies. After several days of considerable supplies of honey in the hive, during nectar-gathering the queen is released from the box, as before, so that she returns to lay in the central part of the hive. The honey stored in the brooding nest in turn partially restricts the queen's laying.

The box may also serve to stop the proliferation of the Acarida Varroa Jacobsoni. The queen of a diseased hive is placed in the box, as before, but for 21 days and preferably in the autumn. The hive body contains no more brood. At the moment of treatment, the few infected brooding frames are removed from the box. The queen may be released at that instant into the hive body, or may be encaged and withdrawn from the hive during the treatment in order to protect her from the harmful effects of the chemical products.

In the event of the queen not being released into the treated hive, she may be placed in the box with empty frames. The box is still fitted in the superhive or body, themselves placed on the treated hive. The queen is still prisoner in the box. She is separated from the hive body by the queen-excluder of the box. Five to ten days afterwards, the queen is released either directly or through the opening made in the queen-excluder by means of the plastic film described hereinabove. The brooding frames of the box which served as trap for the last surviving Acarida, are eliminated at that instant.

A final application of this box, mentioned briefly hereinabove, concerns the fecundation of a virgin queen in a nucleus, and her preservation during the cold season. The box according to the invention is fitted in a superhive or a hive body. The stopper 0, which is removed, releases the hole 19 in the box. The superhive or body must then also be pierced with an entrance, which corresponds exactly to the entrance 19 or 26 of the box.

The bottom of the box is closed by its flap, and it may be equipped with its device for releasing the queen with a view to her transfer and introduction for a future requeening. Three or four boxes, depending on the design, may be placed side by side in a superhive or hive body, in order to avoid heat losses. The superhive or body is pierced with as many entrances as there are boxes.

For the winter season, precautions must be taken to avoid too great a condensation of humidity on the walls of the box. It is advisable to pierce a second hole in the superhive 47 or a second hole in the body 42, symmetrical to the entrance of the opposite wall. The hole 26 of the box is thus placed in communication with the outside. A fine netting is placed on the second hole of the superhive or on the second hole of the body, to promote ventilation of the box, whilst preventing passage of the bees. The removable cover 2 of the box is also equipped with its netting. The boxes are covered with a frame cover 44 or 52 which is adapted to absorb then easily evacuate the humidity, whilst being a good heat insulating means, such as isorel or cardboard.

The invention is, of course, not limited to the embodiments set forth hereinabove, but it covers all the variants thereof made in the same spirit. If, in the foregoing examples, the removable flap adapted to be connected against the bottom of the box in order to obturate the opening of the slots which it comprises, is maintained by simple fit, it might be envisaged to make such a flap so that it may slide against the bottom.

Moreover, although the walls of the box according to the invention may be flat, it is obvious that they may have another configuration, for example have a succession of parts in relief and recesses, made so as to allow the passage of the projecting parts which may be located inside the hive body; moreover, such parts in relief may also maintain the frames within the box.

Furthermore, the queen-excluder, when there is one, may be mounted to slide against the bottom of the box and it may be removed through a slot in the bottom, located in that case against the wall.

What is claimed is:
1. A box for beekeeping, for creating a small colony of bees, for changing a queen bee from one hive in activity and for partially restricting brood rearing or laying, wherein said box is a parallelpipedic enclosure adapted to be fitted into a superhive, or into an upper honey chamber, or into a hive body as a substitute for frames normally disposed in said body or said superhive, said box comprising:
   at least four walls;
   a fixed bottom;
   a removable cover, said fixed bottom and removable cover each comprising an opening whose dimensions are such that they allow at least the passage of the queen and, if necessary, the mixing in less than twelve hours of the bee colony formed or introduced into said box with a second colony;
   at least two slots disposed on each side of said opening, said slots being located adjacent or against two opposite walls of said at least four walls and having a length greater than a width of said opening;
   a plurality of parallel, vertical frames fitted into said enclosure and being spaced apart from one another and from said fixed bottom by a distance sufficient to permit the bees and the queen to circulate;
   at least one entrance on at least one of said at least four walls, said entrance being obturated when the box is placed in position in the hive and said entrance being located opposite the free space between two frames disposed in said box;

netting whose mesh is less than three millimeters, said netting being adapted to be disposed between the cover and a top portion of the frames disposed inside the box and whose dimensions correspond to interior dimensions of said box; and a removable flap for obturating said opening and said slots in the bottom of said box.

2. The box of claim 1, wherein the number of frames with which it is fitted is less than 6.

3. The box of claim 2, wherein the number of frames with which it is fitted is between 2 and 4.

4. The box of claim 1, wherein the frames are maintained inside the box by fitting end portions of each frame in notches made in the upper edges of the walls of said box.

5. The box of claim 1, wherein its walls are smooth.

6. The box of claim 1, wherein a queen-excluder is placed on the bottom and in which is made an opening adapted to be obturated by a plastic film which may be removed by sliding through one of said two slots in the bottom and in two slots made in the queen-excluder on either side of the opening that it comprises.

7. The box of claim 1, wherein a removable, sliding plastic film obturates the upper and lower parts of the opening provided in the bottom, and which passes into the two slots made on either side of said opening.

8. The box of claim 1, wherein the netting is removable.

9. The box of claim 1, wherein the removable flap is maintained in position by a simple fit against the bottom of said box.

10. The box of claiml, wherein the removable flap is mounted to slide against the bottom of said box.

* * * * *